(12) United States Patent
Reedy et al.

(10) Patent No.: US 10,464,468 B2
(45) Date of Patent: Nov. 5, 2019

(54) PROTECTOR ASSEMBLY FOR FLEXIBLE PIPE COILS AND METHOD OF USING SAME

(71) Applicant: Trinity Bay Equipment Holdings, LLC, Houston, TX (US)

(72) Inventors: Max Reedy, Kemah, TX (US); Brett Hamner, Seabrook, TX (US); Alexander Lee Winn, Houston, TX (US); Matthew Allen Hegler, Kingwood, TX (US); Sanjay Bhatia, The Woodlands, TX (US)

(73) Assignee: TRINITY BAY EQUIPMENT HOLDINGS, LLC, Houston, TX (US)

( * ) Notice: Subject to any disclaimer, the term of this patent is extended or adjusted under 35 U.S.C. 154(b) by 0 days.

(21) Appl. No.: 15/880,749

(22) Filed: Jan. 26, 2018

(65) Prior Publication Data

US 2018/0201177 A1 Jul. 19, 2018

Related U.S. Application Data

(63) Continuation of application No. 15/869,586, filed on Jan. 12, 2018.
(Continued)

(51) Int. Cl.
*B60P 7/08* (2006.01)
*B60P 7/12* (2006.01)
(Continued)

(52) U.S. Cl.
CPC .............. *B60P 7/12* (2013.01); *B60P 3/035* (2013.01); *B60P 7/0869* (2013.01);
(Continued)

(58) Field of Classification Search
CPC ........... B60P 7/12; B60P 3/035; B60P 7/0869; B65D 85/66; B65D 85/04; F16L 1/065;
(Continued)

(56) References Cited

U.S. PATENT DOCUMENTS

| 2,622,918 | A | 12/1952 | Staffe |
| 4,526,500 | A | 7/1985 | Patrick |

(Continued)

FOREIGN PATENT DOCUMENTS

WO 2015018655 A1 2/2015

OTHER PUBLICATIONS

United States International Searching Authority, International Search Report and Written Opinion, dated Mar. 9, 2018; PCT Appl. No. PCT/US2018/013967.

*Primary Examiner* — Stephen T Gordon
(74) *Attorney, Agent, or Firm* — Greenberg Traurig, LLP; Dwayne Mason; Mark Chretien (57) ABSTRACT

A system includes a coil contacting base. The coil contacting base includes a radially curved outer surface with a radius of curvature less than or equal to a coil radius of curvature of an interior channel of a coil of spoolable pipe, and the coil contacting base includes a length greater than or equal to an axial dimension of the coil. The system also includes a side wall coupled to an inner surface of the coil contacting base. The side wall is configured to block circumferential movement of a coil restraint. The system also includes a passage disposed between the coil contacting base and the side wall. The coil restraint is configured to be disposed in the passage.

7 Claims, 6 Drawing Sheets

Related U.S. Application Data (60) Provisional application No. 62/447,396, filed on Jan. 17, 2017.

(51) Int. Cl.

| | |
|---|---|
| *F16L 1/06* | (2006.01) |
| *B65H 49/06* | (2006.01) |
| *B61D 45/00* | (2006.01) |
| *B60P 3/035* | (2006.01) |
| *B63B 25/00* | (2006.01) |
| *B63B 25/22* | (2006.01) |
| *B63B 25/28* | (2006.01) |
| *B63B 35/00* | (2006.01) |
| *B65H 49/38* | (2006.01) |

(52) U.S. Cl.
CPC ......... *B61D 45/001* (2013.01); *B61D 45/003* (2013.01); *B63B 25/00* (2013.01); *B63B 25/002* (2013.01); *B63B 25/004* (2013.01); *B63B 25/22* (2013.01); *B63B 25/28* (2013.01); *B63B 35/003* (2013.01); *B65H 49/06* (2013.01); *B65H 49/38* (2013.01); *F16L 1/065* (2013.01); *B65H 2701/33* (2013.01)

(58) Field of Classification Search
CPC .. B65H 75/185; B65H 75/187; B65H 75/242; B65H 49/06; B61D 45/003; B61D 45/001; B63B 25/00; B63B 25/002; B63B 25/004; B63B 25/22; B63B 25/28; B63B 35/003
USPC ................ 410/41, 47–50, 97–100, 120, 155; 248/345.1, 499; 206/397, 413, 415–416, 206/453, 586; 53/409
See application file for complete search history.

(56) References Cited

U.S. PATENT DOCUMENTS

| | | | | |
|---|---|---|---|---|
| 5,076,745 | A * | 12/1991 | Klein | B60P 7/08 |
| | | | | 410/104 |
| 5,236,087 | A | 8/1993 | Morgan | |
| 5,603,403 | A * | 2/1997 | Sather | B65G 7/12 |
| 5,861,204 | A | 1/1999 | O'Sullivan | |
| 6,250,860 | B1 * | 6/2001 | Hornady | B60P 7/0807 |
| | | | | 410/100 |
| 8,439,611 | B2 * | 5/2013 | Quick | B65H 75/185 |
| | | | | 410/100 |
| 10,207,625 | B2 * | 2/2019 | White | B60P 1/16 |
| 2012/0128441 | A1 * | 5/2012 | McDaniel | B60P 7/0869 |
| | | | | 410/47 |
| 2013/0320172 | A1 * | 12/2013 | Skorupa | B60P 7/0823 |
| | | | | 29/428 |

\* cited by examiner

PROTECTOR ASSEMBLY FOR FLEXIBLE
PIPE COILS AND METHOD OF USING
SAME

CROSS-REFERENCE TO RELATED
APPLICATIONS

This application claims the benefit of U.S. Nonprovisional application Ser. No. 15/869,586 filed Jan. 12, 2018, and priority benefit of U.S. Provisional Application 62/447,396 filed Jan. 17, 2017, the disclosures of which are incorporated by reference herein in their entirety.

BACKGROUND

Flexible pipe is useful in a myriad of environments, including in the oil and gas industry. Flexible pipe may be durable and operational in harsh operating conditions and can accommodate high pressures and temperatures. Flexible pipe may be bundled and arranged into one or more coils to facilitate transporting and using the pipe.

Coils of pipe may be positioned in an "eye to the side" or "eye to the sky" orientation. When the flexible pipe is coiled and is disposed with its interior channel facing upwards, such that the coil is in a horizontal orientation, then the coils of pipe are referred to as being in an "eye to the sky" orientation. If, instead, the flexible pipe is coiled and disposed such that the interior channel is not facing upwards, such that the coil is in an upright or vertical orientation, then the coils of pipe are referred to as being in an "eye to the side" orientation.

The flexible pipe may be transported as coils to various sites for deployment (also referred to as uncoiling or unspooling). Different types of devices and vehicles are currently used for loading and transporting coils of pipe, but usually extra equipment and human manual labor is also involved in the process of loading or unloading such coils for transportation and/or deployment. Such coils of pipe are often quite large and heavy. Accordingly, there exists a need for an improved method and apparatus for loading and unloading coils of pipe.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments of the present disclosure relate to a system that includes a coil contacting base. The coil contacting base includes a radially curved outer surface with a radius of curvature less than or equal to a coil radius of curvature of an interior channel of a coil of spoolable pipe, and the coil contacting base has a length greater than or equal to an axial dimension of the coil. The system also includes a side wall coupled to an inner surface of the coil contacting base. The side wall is configured to block circumferential movement of a coil restraint. The system also includes a passage disposed between the coil contacting base and the side wall. The coil restraint is configured to be disposed in the passage.

In another aspect, embodiments of the present disclosure relate to a method that includes inserting a coil protector into an interior channel of a coil of spoolable pipe. The coil protector includes a coil contacting base. The coil contacting base includes a radially curved outer surface with a radius of curvature less than or equal to a coil radius of curvature of the interior channel and the coil contacting base has a length greater than or equal to an axial dimension of the coil. The coil protector also includes a side wall coupled to an inner surface of the coil contacting base and a passage disposed between the coil contacting base and the side wall. The method also includes inserting a coil restraint in the passage, blocking circumferential movement of the coil restraint via the side wall, and securing the coil restraint to a coil transportation carrier or a pipe coil skid coupled to the coil transportation carrier, thereby securing the coil to the coil transportation carrier.

Other aspects and advantages of the claimed subject matter will be apparent from the following description and the appended claims.

DETAILED DESCRIPTION

Embodiments of the present disclosure relate generally to coil protectors used when transporting coils of spoolable pipe. The coils of pipe may be self-supported, for example, using bands to hold coils together. Coil protectors according to embodiments of the present disclosure may include a coil contacting base, a side wall coupled to the coil contacting base, and a passage disposed between the coil contacting base and the side wall.

Embodiments of the present disclosure will be described below with reference to the figures. In one aspect, embodiments disclosed herein relate to embodiments for protecting coils of spoolable pipe during transportation.

As used herein, the term "coupled" or "coupled to" may indicate establishing either a direct or indirect connection, and is not limited to either unless expressly referenced as such. The term "set" may refer to one or more items. Wherever possible, like or identical reference numerals are used in the figures to identify common or the same elements. The figures are not necessarily to scale and certain features and certain views of the figures may be shown exaggerated in scale for purposes of clarification.

Figure 1:
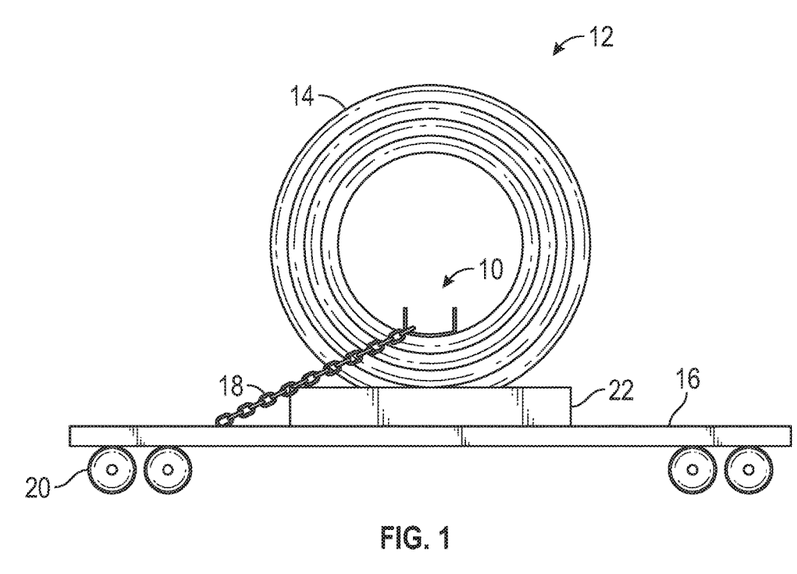
FIG. 1 is a block diagram of a coil protector according to embodiments of the present disclosure.

FIG. 1 illustrates a block diagram of an embodiment of a coil protector 10 used to protect a coil 12 of spoolable pipe 14 while coupled to a coil transportation carrier 16 via a coil restraint 18. Spoolable pipe 14 may refer to any type of flexible pipe or piping capable of being bent into a coil. Such coils of spoolable pipe 14 may reduce the amount of space taken up by pipe during manufacturing, shipping, transportation, and deployment compared to rigid pipe that is not capable of being bent into a coil.

Pipe, as understood by those of ordinary skill, may be a tube to convey or transfer any water, gas, oil, or any type of fluid known to those skilled in the art. The spoolable pipe 14 may be made of any type of materials including without limitation plastics, metals, a combination thereof, composites (e.g., fiber reinforced composites), or other materials known in the art. The flexible pipe of the spoolable pipe 14 is used frequently in many applications, including without limitation, both onshore and offshore oil and gas applications. Flexible pipe may include Flexible Composite Pipe (FCP) or Reinforced Thermoplastic Pipe (RTP). A FCP or RTP pipe may itself be generally composed of several layers. In one or more embodiments, a flexible pipe may include a high-density polyethylene ("HDPE") pipe having a reinforcement layer and an HDPE outer cover layer. Thus, flexible pipe may include different layers that may be made of a variety of materials and also may be treated for corrosion resistance. For example, in one or more embodiments, pipe used to make up a coil of pipe may have a corrosion protection shield layer that is disposed over another layer of steel reinforcement. In this steel-reinforced layer, helically wound steel strips may be placed over a liner made of thermoplastic pipe. Flexible pipe may be designed to handle a variety of pressures. Further, flexible pipe may offer unique features and benefits versus steel/carbon steel pipe lines in the area of corrosion resistance, flexibility, installation speed and re-usability.

The coil transportation carrier 16 may refer to any type of transportation carrier capable of being used to transport coils 12 overland or over water. For example, the embodiment of the coil transportation carrier 16 portrayed in FIG. 1 is a railcar, which may refer to any type of rolling stock transported over rails, such as, but not limited to, railroad cars, goods wagons, freight cars, flat wagons, flat cars, and so forth. In other embodiments, the coil transportation carrier 16 may be any type of transportation carrier transported by trucks or other road vehicles, such as various trailers, semi-trailers, flatbed trailers, lowboy trailers, and so forth. In further embodiments, the coil transportation carrier 16 may be any type of transportation carrier transported over water, such as various vessels, ships, barges, boats, watercrafts, or any other type of water-borne vehicles capable of being used for offshore deployment of spoolable pipe 14 into a body of water, such as a lake, sea, or ocean. Thus, use of the coil protector 10 is not limited to railcars. In certain embodiments, the coil transportation carrier 16 may include two or more pairs of wheels 20. In certain embodiments, a pipe coil skid 22 may be used to hold the coil 12 of spoolable pipe 14 in a vertical orientation.

Figure 2:
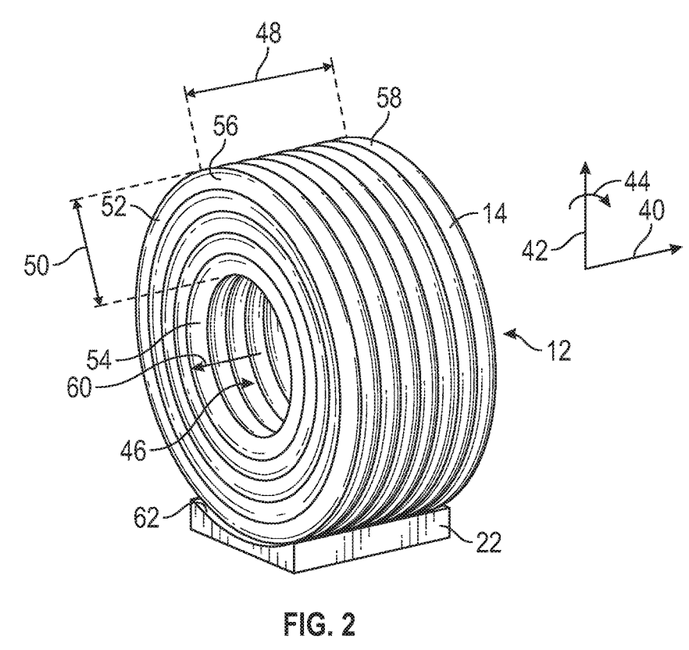
FIG. 2 is a perspective view of an embodiment of a coil of spoolable pipe according to embodiments of the present disclosure.

FIG. 2 illustrates a perspective view of an embodiment of the coil 12 of spoolable pipe 14. The coil 12 may be defined by an axial axis or direction 40, a radial axis or direction 42, and a circumferential axis or direction 44. The coil 12 may be formed by wrapping the spoolable pipe 14 into a coil with an interior channel 46 formed axially 40 therethrough, where the coil 12 may be moved as a single package or bundle of coiled pipe, as shown in FIG. 2. Each complete turn of coiled pipe may be referred to as a wrap of pipe. Multiple wraps of pipe in the coil 12 may be configured in columns along the axial direction 40 of the coil 12 and/or configured in layers along the radial direction 42 of the coil 12. For example, multiple columns of wraps may be formed along the axial direction 40 of the coil 12, where an axial dimension 48 of the coil 12 is based on the diameter of the pipe 14 and the number and axial 40 position of wraps forming the coil 12. Further, multiple layers of wraps may be formed along the radial direction 42 of the coil 12, where a radial dimension 50 of the coil 12 is based on the diameter of the pipe and the number and radial 42 position of the wraps forming the coil 12. In certain embodiments, a weight of the coil 12 may exceed 40,000 pounds (18,144 kilograms).

As shown in FIG. 2, the coil 12 of spoolable pipe 14 may be one or more layers (e.g., layers 52 and 54) of pipe packaged or bundled into the coil 12. The coil 12 may include at least one or more layers of pipe that have been coiled into a particular shape or arrangement. As shown in FIG. 2, the coil 12 is coiled into a substantially cylindrical shape having substantially circular bases 56 and 58 formed on each end of the coil 12, where the axial dimension 48 of the coil 12 is measured between the two bases 56 and 58.

As known to those of ordinary skill in the art, the spoolable pipe 14 used to make up the coil 12 shown in FIG. 2 may be coiled using spoolers or other coiler machines suited for such a function. Those of ordinary skill will recognize that the present disclosure is not limited to any particular form of coiler or other device that may be used to form pipe into a coil. Coiling pipe into a coil of pipe, such as coil 12, assists when transporting pipe, which may be several hundred feet in length in one or more embodiments. Further, the coil 12 may be assembled as a coil to facilitate deployment of the coil. Deployment, as used herein, may refer to the action of unspooling or unwinding the spoolable pipe 14 from the coil 12.

After being assembled into a coil, the coil 12 shown in FIG. 2 may include the interior channel 46 formed axially 40 through the coil 12. The interior channel 46 is a bore disposed generally in the center of the coil 12. The interior channel 46 is substantially circular-shaped. The coil 12 may have an outer diameter (OD) and an inner diameter (ID), where the inner diameter is defined by the interior channel 46. In addition, the interior channel 46 may be defined by a coil radius of curvature 60.

As shown in FIG. 2, the pipe coil skid 22 may include a platform 62 upon which the coil 12 may be disposed to hold the coil 12 in a vertical orientation. The platform 62 can have a concave curvature shape on its upward facing side (when pipe coil skid 22 sits on a horizontal surface) that generally corresponds to the outer circumferential 44 shape of the coil 12, such that when the coil 12 sits within the pipe coil skid 22, it is generally flush with the platform 62. However, the above description should not be deemed limiting with respect to the shape, construction or application of the pipe coil skid 22, as pipe coil skid 22 may have any shape, construction and/or application that is within the scope of the description and figures herein. In one or more embodiments, the coil 12 may be loaded and unloaded by a pipe deployment trailer, crane, forklift or other lifting device while remaining attached to the pipe coil skid 22.

Figure 3:
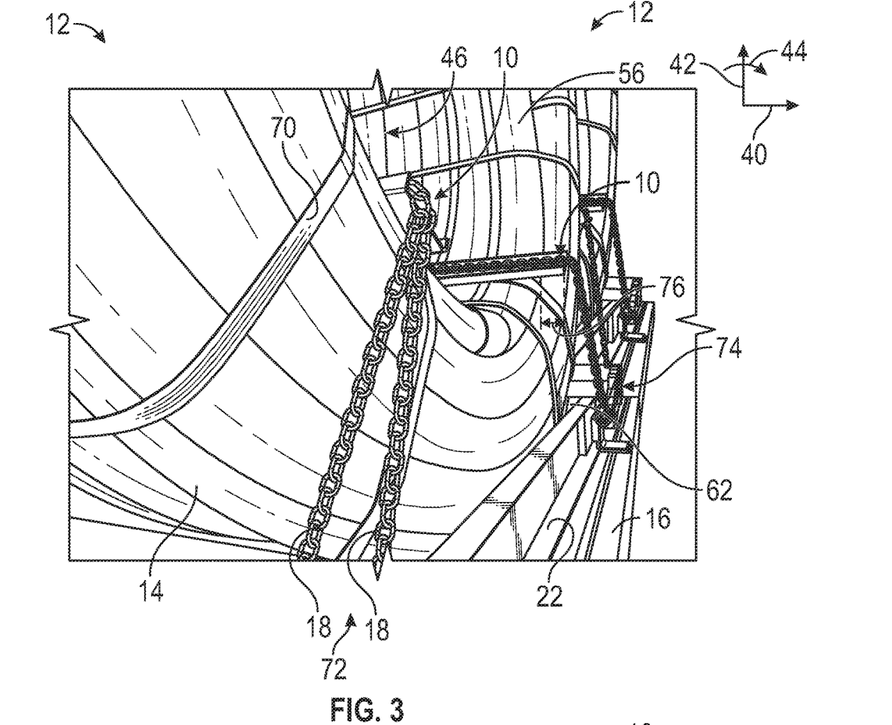
FIG. 3 is a perspective view of an embodiment of a coil protector according to embodiments of the present disclosure.

FIG. 3 illustrates a perspective view of an embodiment of the coil protector 10. As shown in FIG. 3, the coil 12 may be secured by straps 70 or bands, and the coil 12 may be disposed on the pipe coil skid 22. In addition, a first coil protector 10 and a second coil protector 10 may be used to secure the coil 12 to the coil transportation carrier 16 (e.g., railcar) via one or more coil restraints 18 coupled to the coil transportation carrier 16. In certain embodiments, the coil restraints 18 may be coupled to the pipe coil skid 22 and other techniques used to secure the pipe coil skid 22 to the coil transportation carrier 16. In the illustrated embodiment, the coil restraints 18 are chains, but various types of restraints may be used in other embodiments, such as belts, cables, ropes, or similar products. Two lengths of coil restraints 18 are used with each coil protector 10 in FIG. 3, but different numbers of coil restraints 18 may be used depending on the size, dimensions, weight, and orientation of the coil 12 and the particular securement requirements associated with the coil transportation carrier 16. Further, the first and second coil protectors 10 are spaced circumferentially 44 apart from one another with the first coil protector 10 disposed near a first side 72 of the pipe coil skid 22 and the second coil protector 10 disposed near a second side 74 of the pipe coil skid 22. In other embodiments, different numbers of coil restraints 18 may be used depending on the size, dimensions, weight, and orientation of the coil 12 and the particular securement requirements associated with the coil transportation carrier 16. For example, each coil 12 may be secured using one, three, four or more coil protectors 10 and coil restraints 18. Embodiments of the coil protector 10 do not extend completely circumferentially 44 about the interior channel 46 (e.g., the coil protectors 10 are not complete circles). In addition, the coil protector 10 extends a distance 76 beyond the circular base 56, thereby helping to prevent the coil restraints 18 from contacting the circular base 56. In other words, the coil protector 10 is longer than the axial dimension 48 of the coil 12 so that the coil protector 10 extends the distance 76 beyond both circular bases 56 and 58. In other embodiments, the coil protector 10 may not extend beyond the circular bases 56 and 58, such as when there is no concern with the coil restraints 18 contacting the spoolable pipe 14 (e.g., abrasion) or when beam strength along the axial direction 40 is desired. Further details of the coil protector 10 are described in detail below.

Figure 4:
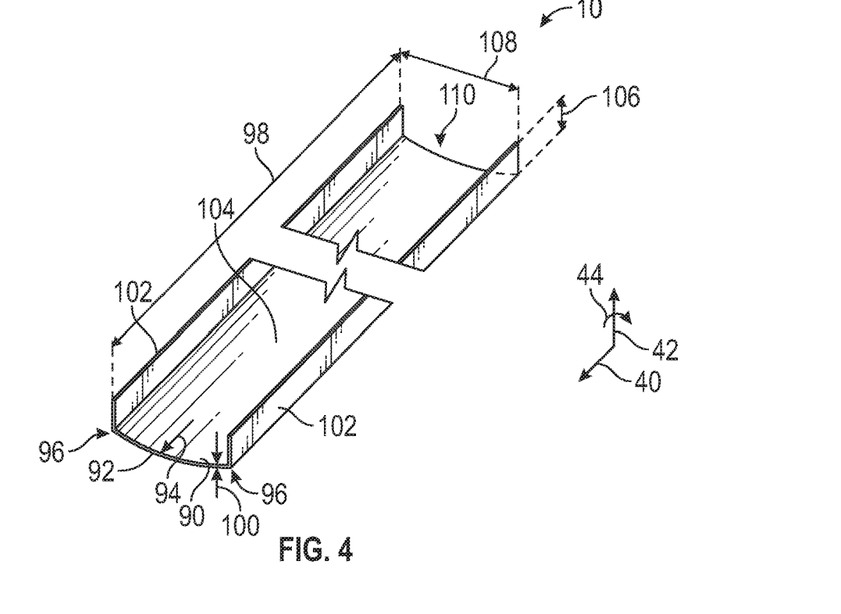
FIG. 4 is a perspective view of an embodiment of a coil protector according to embodiments of the present disclosure.

FIG. 4 illustrates a perspective view of an embodiment of the coil protector 10. In the illustrated embodiment, the coil protector 10 includes a coil contacting base 90 that has an outer surface 92 with a radius of curvature 94 that is approximately less than or equal to the coil radius of curvature 60 of the interior channel 46 of the coil 12, which may help prevent edges 96 of the coil contacting base 90 from pushing into the outer surface of the spoolable pipe 14 when the coil restraints 18 are tightened. In other words, substantially all or most of the outer surface 92 may contact the interior channel 46, thereby distributing the force exerted by the coil restraints 18 over a large portion of the interior channel 46 proximate the coil protector 10. Further, the curved outer surface 92 provides a smooth surface for the spoolable pipe 14 to contact, thereby reducing the potential for any damage to the outer surface of the spoolable pipe 14. In certain embodiments, a coating or other layer may be applied or coupled to the outer surface 92 to help prevent the coil protector 10 from sliding or moving along the surface of the spoolable pipe 14. Examples of such coatings include, but not limited to, foam, rubber, plastic, or other materials. In addition, such materials may possess some degree of compliance (i.e., inverse of stiffness) or resilience that helps prevent the coil protector 10 from damaging the outer surface of the spoolable pipe 14. In certain embodiments, the cross-sectional shape of the outer surface 92 may not be continuous or smooth, but may include short straight sections separated by bends commonly associated with the fabrication technique referred to as bump-forming. Thus, the cross-sectional shape of the outer surface 92 may form part of a polygon. In such embodiments, the radius of curvature 94 refers to the radius of the circumscribed circle or circumcircle of the polygon (e.g., circumradius). In addition, the outer surface 92 of such embodiments may still be referred to as radially curved.

As shown in FIG. 4, the coil contacting base 90 may have a length 98 that is approximately greater than or equal to the axial dimension 48 of the coil 12. As discussed above, the length 98 is selected so that ends of the coil protector 10 extend the distance 76 beyond both circular bases 56 and 58 when inserted into the coil 12. Further, the coil contacting base 90 may be defined by a thickness 100, which may be selected to provide sufficient strength and stability for the coil protector 10 when in use. In other words, a coil protector 10 with a larger thickness 100 may be stronger and more resistant to bending than another coil protector 10 with a smaller thickness 100. However, the coil protector 10 with the larger thickness 100 may be heavier. In certain embodiments, the coil contacting base 90 may be made from various metals, such as steel, aluminum, titanium, or alloys thereof. The material selected for the coil protector 10 may be based on the strength and weight requirements of a particular application. Although shown as a solid sheet of material in FIG. 4, the coil contacting base 90 may include openings or cutouts to reduce the weight of the coil protector 10. For example, the coil contacting base 90 may be made from expanded metal sheet or similar material.

In the illustrated embodiment, the coil protector 10 also includes two side walls 102 coupled to an inner surface 104 of the coil contacting base 90. In other embodiments, the coil protector 10 may include one, three, four or more side walls 102. The side wall 102 may block circumferential 44 movement of the coil restraint 18. In other words, without the side wall 102, the coil restraint 18 may potentially slide or slip off the inner surface 104 when tightened. Thus, the side wall 102 may provide a surface for the coil restraint 18 to rest against when tightened. In certain embodiments, the side wall 102 may be coupled to the coil contacting base 90 via a variety of techniques, such as, but not limited to, welding, brazing, gluing, bonding, bolting, screwing, and so forth. In other embodiments, the side wall 102 may be formed by bending a portion of the coil contacting base 90. Such embodiments may also be referred to as having the side wall 102 coupled to the coil contacting base 90. The side wall 102 may be defined by a side wall height 106 and the side walls 102 may be spaced a distance 108 apart from one another. When the side walls 102 are disposed at the edges 96, the distance 108 may also correspond to the width of the coil contacting base 90. Further, although the side walls 102 are shown at the edges 96 of the coil contacting base 90 in FIG. 4, in other embodiments, the side walls 102 may be located at other locations of the inner surface 104. Other characteristics of the side walls 102 may be varied in similar ways as the coil contacting base 90. In other words, the thickness 100, composition, and configuration of the side walls 102 may be selected to suit a particular application.

In the illustrated embodiment, the coil protector 10 also includes a passage 110 disposed between the coil contacting base 90 and the side walls 102. In other words, the passage 110 is formed in the space between the coil contacting base 90 and the side walls 102. As shown previously in FIG. 3, the coil restraint 18 is configured to be disposed in the passage 110 when the coil 12 is secured to the coil transportation carrier 16.

Figure 5:
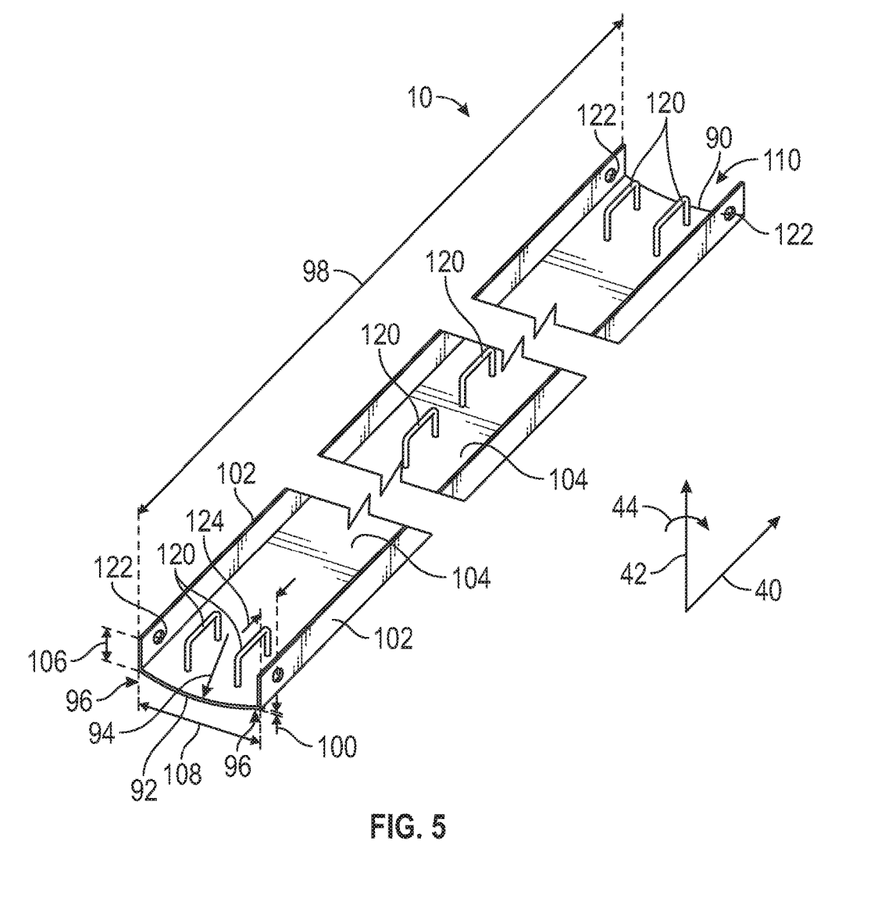
FIG. 5 is a perspective view of an embodiment of a coil protector according to embodiments of the present disclosure.

FIG. 5 illustrates a perspective view of an embodiment of the coil protector 10 that includes additional features. For example, the coil protector 10 shown in FIG. 5 includes one or more handles 120 coupled to the inner surface 104. The handles 120 may be used by a person to lift or handle the coil protector 10, such as when inserting the coil protector 10 into the interior channel 46 of the coil 12. The handles 120 may be disposed near the ends of the coil protector 10 and/or along the length of the coil protector 10. In certain embodiments, the handles 120 may be made from round or flat steel bar stock or strips, and coupled to the inner surface 104 via a variety of techniques, such as, but not limited to, welding, brazing, gluing, bonding, bolting, screwing, and so forth. In addition, the handles 120 may also serve a similar function as the side walls 102 by blocking circumferential 44 movement of the coil restraint 18. In other words, the handles 120 may form channels or passages through which the coil restraint 18 may be disposed. In further embodiments, the handles 120 may be disposed at other locations, such as coupled to inner or outer surfaces of the side walls 102, or along the edges or tops of the side walls 102.

In the illustrated embodiment, the coil protector 10 also includes one or more holes 122 to enable a wire (not shown) to be inserted through the holes 122 and the coil restraint 18 to block movement of the coil restraint 18. In other words, the wire may be threaded through the holes 122 and the coil restraint 18, and the wire tightened or secured to help prevent movement or loosening of the coil restraint 18 during transport of the coil 12. The holes 122 may be disposed a hole distance 124 away from ends of the coil protector 10. Although the holes 122 are shown with circular shapes in FIG. 5, in other embodiments, the holes 122 may have other shapes, such as, but not limited to, ovals, squares, rectangles, triangles, polygons, or other regular or irregular shapes. In certain embodiments, the handles 120 may be used to secure the wire. In other respects, the coil protector 10 shown in FIG. 5 is similar to that shown in FIG. 4.

Figure 6:
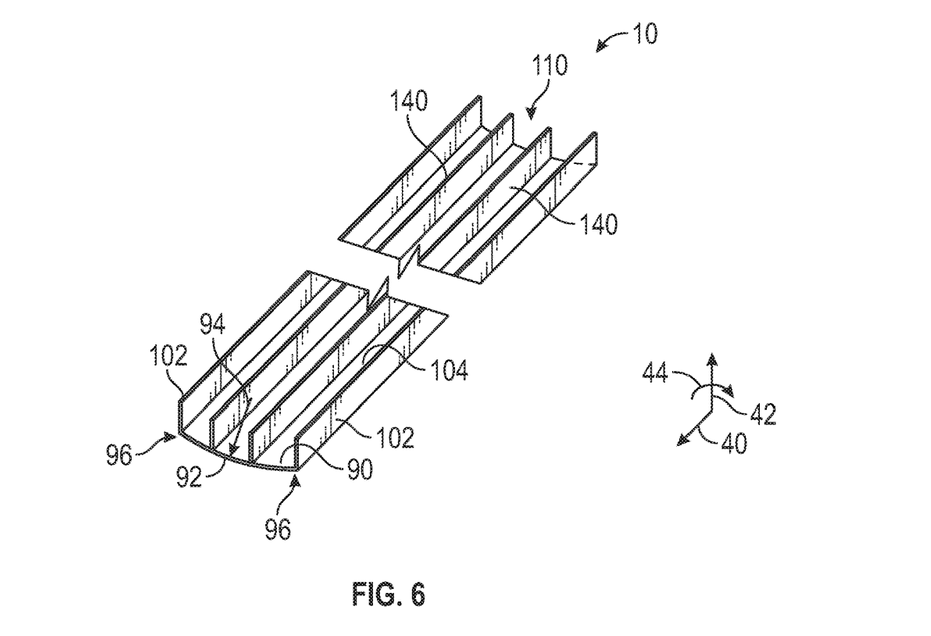
FIG. 6 is a perspective view of an embodiment of a coil protector that includes beams according to embodiments of the present disclosure.

FIG. 6 illustrates a perspective view of an embodiment of the coil protector 10 that includes one or more beams 140 coupled to the inner surface 104 to increase a stiffness or strength of the coil contacting base 90. In other words, the beams 140 may be used to help the coil protector 10 to resist deflection or deformation, especially in the radial direction 44 when placed under a load by the coil restraint 18. The beams 140 may appear and function similar to the side walls 102. However, the beams 140 may be made from a different material than the coil contacting base 90 or side walls 102. For example, the material used for the beams 140 may have a greater stiffness or strength than that used for the coil contacting base 90 or side walls 102. Thus, the beams 140 may be used to increase the overall stiffness or strength of the coil protector 10 without manufacturing the entire coil protector 10 from the material used for the beams 140, which may be more expensive than that used for the rest of the coil protector 10. In the illustrated embodiment, the coil protector 10 includes two beams 140, but in other embodiments, the coil protector 10 may include one, three, four or more beams 140. In addition, the beams 140 may have lengths, heights, thicknesses, and shapes different from the side walls 102, depending on the requirements of a particular application. For example, shorter beams 140 may be disposed only at ends of the coil protector 10 or a shorter beam 140 disposed near the center (e.g., centroid or center of mass) of the coil protector 10, which may reduce the weight of the beams 140 compared to those that extend along the length 98 of the coil contacting base 90. In certain embodiments, the beam 140 may be formed as a T-beam coupled to the coil contacting base 90. In further embodiments, other types of beams or reinforcements (e.g., I-beams, angles (L), channels (C), or tubes) may be used for the beams 140.

Figure 7:
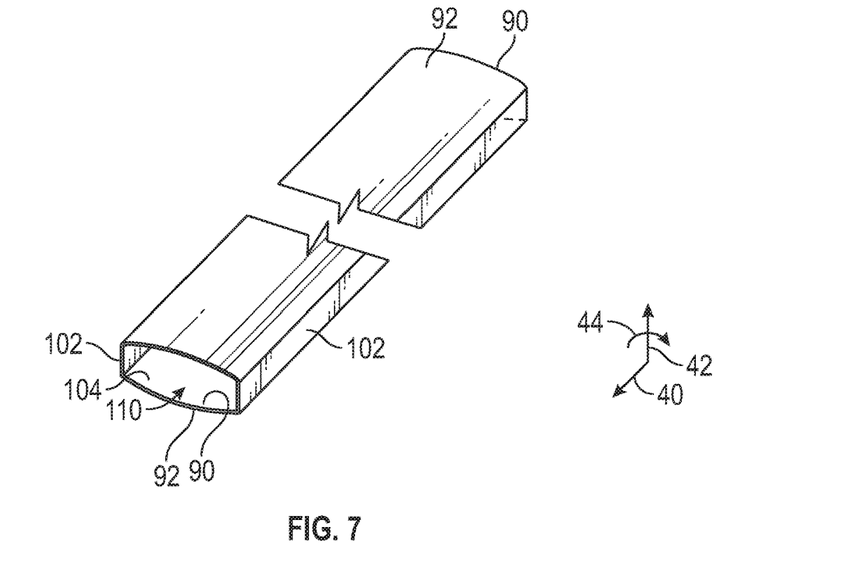
FIG. 7 is a perspective view of an embodiment of a coil protector that includes a second coil contacting base according to embodiments of the present disclosure.

FIG. 7 illustrates a perspective view of an embodiment of the coil protector 10 that includes a second coil contacting base 90 coupled to the two side walls 102. Thus, the passage 110 is disposed between the coil contacting bases 90 and the side walls 102. The second coil contacting base 90 may be essentially identical to the other coil contacting base 90. The coil protector 10 shown in FIG. 7 may possess certain advantages compared to other embodiments of the coil protector 10. For example, embodiments of the coil protector 10 with one coil contacting base 90 may be susceptible to permanent deformation caused by the load exerted by the coil restraint 18 since the load is always exerted in the same direction. However, the embodiment of the coil protector 10 shown in FIG. 7 may better resist such permanent deformation because the coil protector 10 can be used with either coil contacting base 90 placed against the interior channel 46. The orientation of the coil protector 10 could be alternated between uses or tracked to provide substantially equal usage of the two coil contacting bases 90. Since the coil contacting bases 90 experience loads in both directions, the coil contacting bases 90 may resist permanent deformation or be used longer before permanently deforming. Further, the design and construction of the embodiment of the coil protector 10 shown in FIG. 7 may have a greater overall stiffness or strength and thereby resist permanent deformation whether used with alternating or equal orientations or not. Further, the second coil contacting base 90 may help block radial 42 or circumferential 44 movement of the coil restraint 18. In addition, the embodiment of the coil protector 10 shown in FIG. 7 may include other previously described features, such as the beams 140, which could be coupled to both coil contacting bases 90 to increase the stiffness and strength of the coil protector 10. In one embodiment, the second coil contacting base 90 may have a flat cross-sectional shape, thereby giving the coil protector 10 a D-shape. Such embodiments of the coil protector 10 may be used when a common loading direction (e.g., with the curved first coil contacting base 90 against the spoolable pipe 14) is used, but the other benefits of the second coil contacting base 90 are still desired. This embodiment may also include one or more beams 140.

Figure 8:
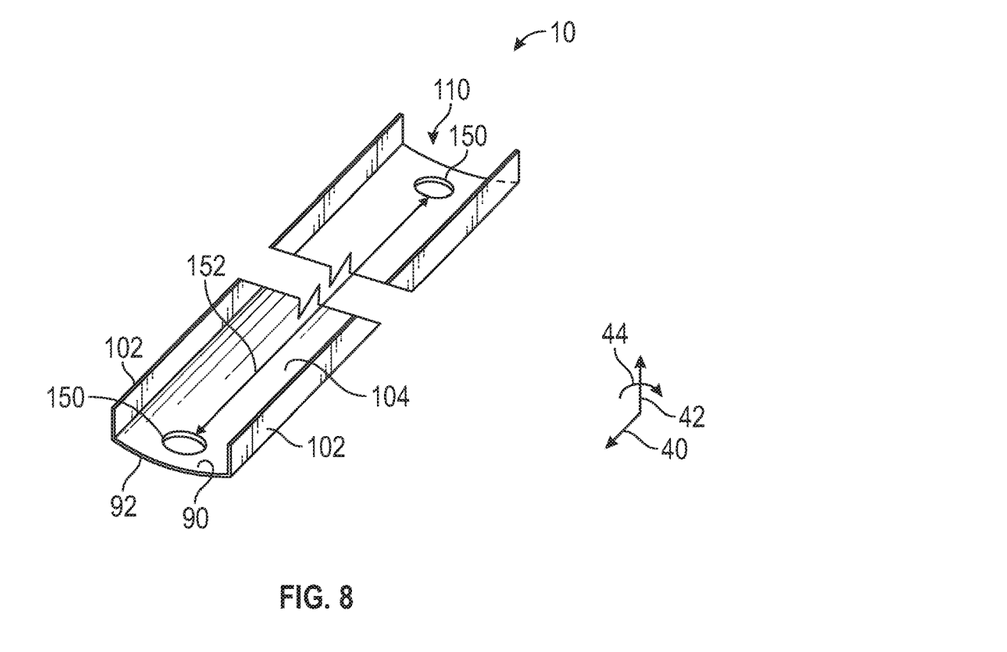
FIG. 8 is a perspective view of an embodiment of a coil protector that includes holes formed in a coil contacting base according to embodiments of the present disclosure.

FIG. 8 illustrates a perspective view of an embodiment of the coil protector 10 that includes one or more holes 150 formed in the coil contacting base 90. For example, the holes 150 may be disposed at both ends of the coil protector 10 and the coil restraint 18 may be inserted through the holes 150 instead of disposing the coil restraint 18 along the entire length 98 of the coil protector 10. Thus, shorter lengths of coil restraint 18 may be used with the illustrated embodiment of the coil protector 10. Alternatively, the coil restraint 18 may be disposed along the length 98 and passed through the holes 150 instead of along the edges of the ends of the coil protector 10. In such embodiments, the length 98 of the coil protector 10 may be selected so that a distance 152 between the holes 150 is approximately greater than or equal to the axial dimension 48 of the coil 12. In other words, the length 98 and distance 152 are selected so that the holes 150 extend the distance 76 beyond both circular bases 56 and 58. The size of the holes 150 may be selected to enable the coil restraint 18 to be easily inserted through the holes 150. In addition, although the holes 150 are shown with circular shapes in FIG. 8, in other embodiments, the holes 150 may have other shapes, such as, but not limited to, ovals, squares, rectangles, triangles, polygons, or other regular or irregular shapes. In certain embodiments, the holes 150 may take the form of notches at the ends of the coil protector 10. In other respects, the coil protector 10 shown in FIG. 8 is similar to those previously described and may include other previously described features.

Figure 9:
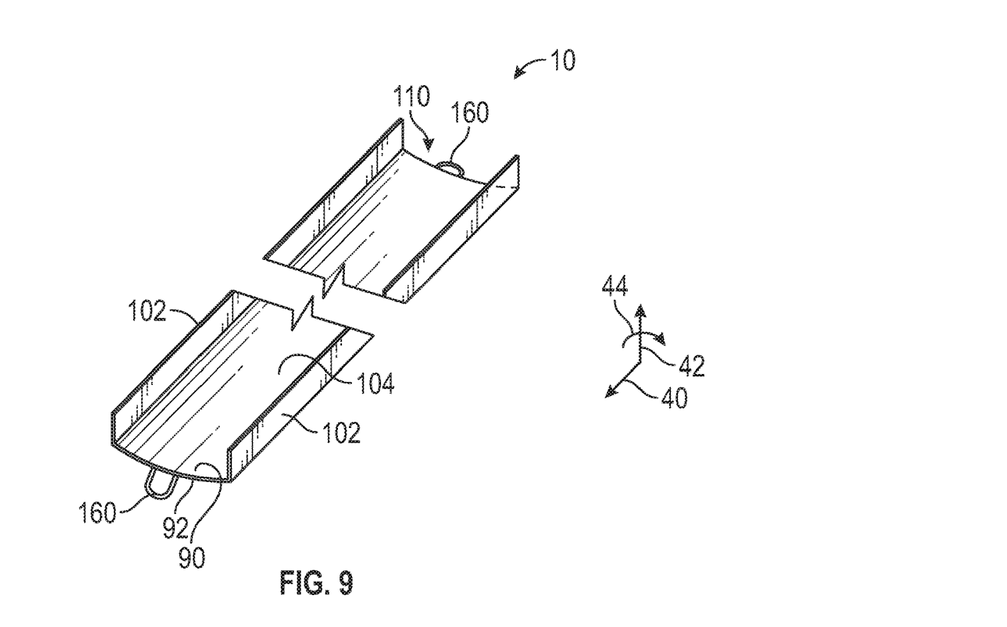
FIG. 9 is a perspective view of an embodiment of a coil protector that includes rings coupled to ends of a coil contacting base according to embodiments of the present disclosure.

FIG. 9 illustrates a perspective view of an embodiment of the coil protector 10 that includes one or more rings 160 coupled to the ends of the coil contacting base 90. The rings 160 may function in a similar manner to the holes 150. For example, the rings 160 may be disposed at both ends of the coil protector 10 and the coil restraint 18 may be inserted through the rings 160 instead of disposing the coil restraint 18 along the entire length 98 of the coil protector 10. Alternatively, the coil restraint 18 may be disposed along the length 98 and passed through the rings 160 instead of along the edges of the ends of the coil protector 10. The length 98 of the coil protector 10 may be selected to be approximately greater than or equal to the axial dimension 48 of the coil 12. In other words, the length 98 is selected so that the rings 160 extend the distance 76 beyond both circular bases 56 and 58. The size of the rings 160 may be selected to enable the coil restraint 18 to be easily inserted through the rings 160. In addition, although the rings 160 are shown with partially circular shapes in FIG. 9, in other embodiments, the rings 160 may have other shapes, such as, but not limited to, ovals, squares, rectangles, triangles, polygons, or other regular or irregular shapes. In other respects, the coil protector 10 shown in FIG. 9 is similar to those previously described and may include other previously described features.

Figure 10:
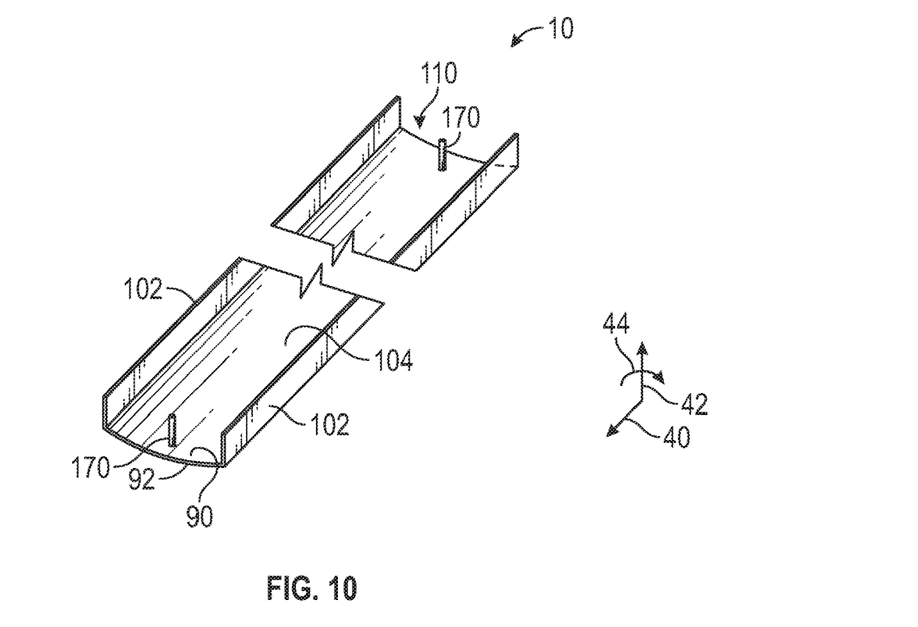
FIG. 10 is a perspective view of an embodiment of a coil protector that includes rods coupled to an inner surface of a coil contacting base according to embodiments of the present disclosure.

FIG. 10 illustrates a perspective view of an embodiment of the coil protector 10 that includes one or more rods 170 coupled to the inner surface 104 of the coil contacting base 90. In certain embodiments, the rods 170 may be made from round or flat steel bar stock or strips, and coupled to the inner surface 104 via a variety of techniques, such as, but not limited to, welding, brazing, gluing, bonding, bolting, screwing, and so forth. In certain embodiments, the rods 170 may take the form of hooks or any other commonly available rigging component. The coil restraint 18 may be looped around or secured to the rods 170 instead of disposing the coil restraint 18 along the entire length 98 of the coil protector 10. Alternatively, the coil restraint 18 may be disposed along the length 98 and looped around or secured to the rods 170 to help prevent movement of the coil restraint 18. In further embodiments, the coil restraint 18 may be permanently coupled to the coil protector 10. In other respects, the coil protector 10 shown in FIG. 10 is similar to those previously described and may include other previously described features.

Figure 11:
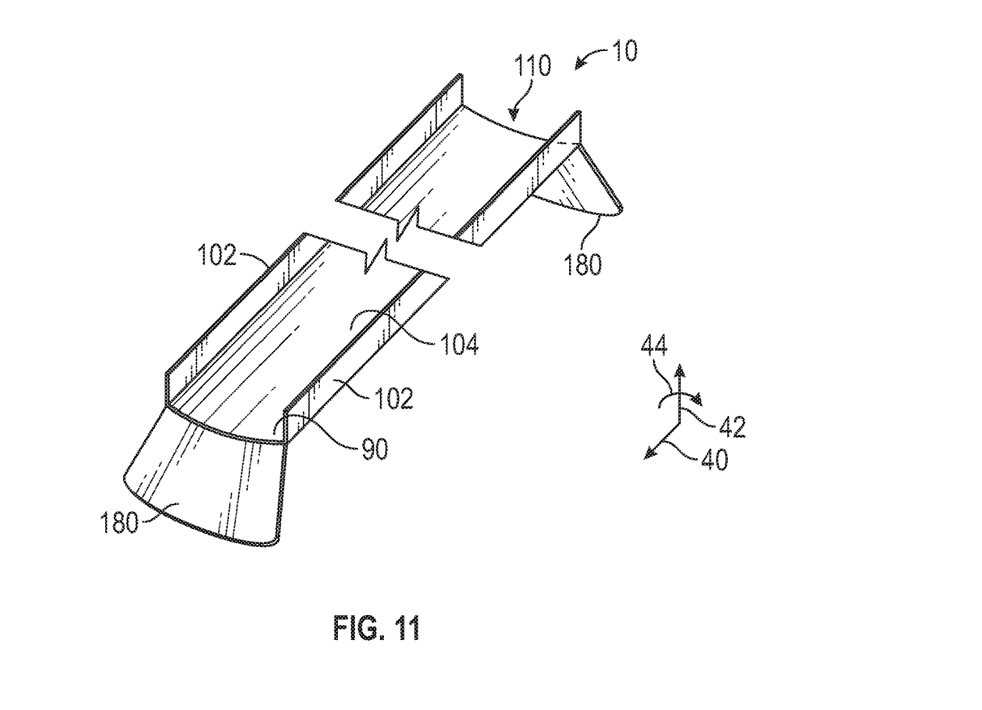
FIG. 11 is a perspective view of an embodiment of a coil protector that includes coil side protectors coupled to ends of a coil contacting base according to embodiments of the present disclosure.

FIG. 11 illustrates a perspective view of an embodiment of the coil protector 10 that includes coil side protectors 180 coupled to ends of the coil contacting base 90. In the illustrated embodiment, the coil side protectors 180 help block contact of the coil restraint 18 with the circular bases 56 and 58 of the coil 12. In certain embodiments, the coil side protectors 180 may be coupled to the coil contacting base 90 via a variety of techniques, such as, but not limited to, welding, brazing, gluing, bonding, bolting, screwing, and so forth. In other embodiments, the coil side protectors 180 may be formed by bending portions of the coil contacting base 90, which may also be referred to as being coupled to the coil contacting base 90. In such embodiments, the length 98 may be approximately equal to the axial dimension 48 of the coil 12 because the coil side protectors 180 help block contact of the coil restraint 18 with the circular bases 56 and 58 of the coil 12. Thus, the ends of the coil protector 10 may not extend the distance 76 beyond the circular bases 56 and 58. The dimensions, shapes, and materials of the coil side protectors 180 may be selected to suit the requirements of a particular application. In certain embodiments, the coil side protectors 180 may include features similar to those shown in FIGS. 8-10, such as holes 150, rings 160, or rods 170. In other respects, the coil protector 10 shown in FIG. 11 is similar to those previously described and may include other previously described features.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A system, comprising a coil contacting base for securing a coil of spoolable pipe, wherein the coil contacting base comprises a radially curved outer surface with a radius of curvature less than or equal to a coil radius of curvature of an interior channel of the coil of spoolable pipe, and wherein the coil contacting base comprises a length greater than or equal to an axial dimension of the coil of spoolable pipe;
   a side wall coupled to an inner surface of the coil contacting base and extending the length of the coil contacting base, wherein the side wall is configured to block circumferential movement of a coil restraint, and wherein the side wall comprises a hole configured to enable a wire to be inserted through the hole and the coil restraint to block movement of the coil restraint; and
   a passage disposed between the coil contacting base and the side wall, wherein the coil restraint is configured to be disposed in the passage.

2. The system of claim 1, comprising a second side wall coupled to the coil contacting base, wherein the second side wall is configured to block circumferential movement of the coil restraint, and the passage is disposed between the coil contacting base and the side walls.

3. The system of claim 2, comprising a second coil contacting base coupled to the side walls, wherein the second coil contacting base comprises a radially curved outer surface with a radius of curvature less than or equal to the coil radius of curvature of the interior channel, wherein the second coil contacting base comprises a length greater than or equal to the axial dimension of the coil, and wherein the passage is disposed between the coil contacting bases and the side walls.

4. The system of claim 1, wherein the coil contacting base and the side wall comprise a metal.

5. The system of claim 1, comprising a handle coupled to the inner surface, wherein the handle is configured to enable lifting or handling of the system.

6. A method, comprising:
inserting a coil protector into an interior channel of a coil of spoolable pipe, wherein the coil protector comprises:
a coil contacting base, wherein the coil contacting base comprises a radially curved outer surface with a radius of curvature less than or equal to a coil radius of curvature of the interior channel, and wherein the coil contacting base comprises a length greater than or equal to an axial dimension of the coil;
a side wall coupled to an inner surface of the coil contacting base and extending the length of the coil contacting base; and
a passage disposed between the coil contacting base and the side wall;
inserting a coil restraint in the passage;
blocking circumferential movement of the coil restraint via a wire inserted through the coil restraint and a hole formed in the side wall; and
securing the coil restraint to a coil transportation carrier or a pipe coil skid coupled to the coil transportation carrier, thereby securing the coil to the coil transportation carrier.

7. The method of claim 6, comprising lifting or handling the coil protector via a handle coupled to the inner surface.

* * * * *